(12) United States Patent
Chou et al.

(10) Patent No.: US 10,525,693 B2
(45) Date of Patent: Jan. 7, 2020

(54) EXTRUSION DEVICE OF THREE-DIMENSIONAL PRINTER AND COOLING MECHANISM AND COOLING METHOD THEREOF

(71) Applicant: TECO IMAGE SYSTEMS CO., LTD., Taipei (TW)

(72) Inventors: Ken-Te Chou, Taipei (TW); Ting-Chun Chen, Taipei (TW); Yu-Jen Chang, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 365 days.

(21) Appl. No.: 15/259,731

(22) Filed: Sep. 8, 2016

(65) Prior Publication Data

US 2018/0015656 A1 Jan. 18, 2018

(30) Foreign Application Priority Data

Jul. 14, 2016 (TW) .............................. 105122305 A

(51) Int. Cl.
*B29C 64/209* (2017.01)
*B29C 48/02* (2019.01)
(Continued)

(52) U.S. Cl.
CPC .............. *B33Y 40/00* (2014.12); *B29C 48/02* (2019.02); *B29C 48/87* (2019.02); *B29C 48/92* (2019.02);
(Continued)

(58) Field of Classification Search
None
See application file for complete search history.

(56) References Cited

U.S. PATENT DOCUMENTS

| 5,340,433 A | 8/1994 | Crump |
| 6,253,116 B1 * | 6/2001 | Zhang .................... B33Y 10/00 700/119 |

(Continued)

FOREIGN PATENT DOCUMENTS

| CN | 204109210 U | 1/2015 |
| CN | 104760278 A | 7/2015 |

(Continued)

OTHER PUBLICATIONS

English translation of CN203805324U (Year: 2014).*

*Primary Examiner* — Jacob T Minskey
*Assistant Examiner* — Baileigh Kate Darnell
(74) *Attorney, Agent, or Firm* — Kirton McConkie; Evan R. Witt

(57) ABSTRACT

An extrusion device of a three-dimensional printer comprises a housing, a nozzle, a ratchet, an idler and a cooling mechanism. The nozzle is connected with the housing, the ratchet is disposed in the housing, and the idler is disposed adjacent to the ratchet. A thermofusible material is jointly held by the ratchet and the idler, and is guided to be extruded through the nozzle. The cooling mechanism comprises an air pump and an air pipe. The air pipe is partially disposed in the housing and connected with the air pump for guiding the air extracted by the air pump to flow into the housing through the air pipe, thereby reducing an environment temperature inside the housing. Therefore, by disposing the air-guiding cooling mechanism, the advantages of enhancing the cooling effect and the printing quality are achieved.

6 Claims, 4 Drawing Sheets

(51) Int. Cl.
  *B29C 48/87* (2019.01)
  *B33Y 40/00* (2015.01)
  *B33Y 30/00* (2015.01)
  *B33Y 50/02* (2015.01)
  *B29C 64/393* (2017.01)
  *B29C 48/92* (2019.01)
  *B29C 64/118* (2017.01)
  *B29C 48/25* (2019.01)

(52) U.S. Cl.
  CPC .......... *B29C 64/209* (2017.08); *B29C 64/393* (2017.08); *B33Y 30/00* (2014.12); *B33Y 50/02* (2014.12); *B29C 48/2566* (2019.02); *B29C 64/118* (2017.08)

(56) References Cited

U.S. PATENT DOCUMENTS

| | | | |
|---|---|---|---|
| 6,932,935 B1* | 8/2005 | Oberhofer | B22C 7/00 264/101 |
| 7,427,374 B2 | 9/2008 | Fong | |
| 7,901,604 B2* | 3/2011 | Oberhofer | B22C 7/00 264/113 |
| 9,630,362 B2* | 4/2017 | Ventolina Cordero | B33Y 30/00 |
| 2002/0084542 A1* | 7/2002 | Suzuki | B29C 47/0026 264/40.3 |
| 2007/0001342 A1* | 1/2007 | Oberhofer | B22C 7/00 264/237 |
| 2007/0193981 A1* | 8/2007 | Peng | B23K 26/1476 219/121.33 |
| 2010/0012630 A1* | 1/2010 | Leuterer | B22F 3/003 219/121.65 |
| 2014/0225301 A1* | 8/2014 | Xu | B29C 47/38 264/177.19 |
| 2014/0328963 A1* | 11/2014 | Mark | B29C 64/386 425/143 |
| 2015/0190963 A1* | 7/2015 | Lee | B33Y 30/00 425/375 |
| 2015/0328837 A1* | 11/2015 | Ventolina Cordero | B33Y 30/00 425/132 |
| 2016/0193778 A1 | 7/2016 | Lee et al. | |
| 2016/0230283 A1* | 8/2016 | Tseliakhovich | B33Y 10/00 |

FOREIGN PATENT DOCUMENTS

| | | |
|---|---|---|
| CN | 105082534 A | 11/2015 |
| CN | 105082543 A | 11/2015 |
| CN | 105415692 A | 3/2016 |

* cited by examiner

EXTRUSION DEVICE OF THREE-DIMENSIONAL PRINTER AND COOLING MECHANISM AND COOLING METHOD THEREOF

CROSS-REFERENCE TO RELATED APPLICATION

This application claims priority from Taiwan Patent Application No. TW 105122305, filed on Jul. 14, 2016, the entire contents of which are incorporated herein by reference for all purposes.

FIELD OF THE INVENTION

The present invention relates to an extrusion device of a three-dimensional printer, and more particularly to an extrusion device of a three-dimensional printer and a cooling mechanism and a cooling method thereof.

BACKGROUND OF THE INVENTION

Recently, the 3D printing, also known as the additive manufacturing (or called "AM"), is more and more general, among which the fused deposition modeling (hereinafter "FDM") additive manufacturing is widely applied to kinds of machines. The FDM additive manufacturing is applying a three-axial machine cooperating with a nozzle to extrude plastic materials or other materials for molding. The extrusion nozzles generally comprises a ratchet for holding wire-shaped materials, and the wire-shaped materials are push to the nozzles by friction and are heated to a specific temperature for fusing the wire-shaped materials to the molten state at the ends of the nozzles. Fine wire-shaped materials are extruded through the tiny nozzles, then filled to the working area in layers, and stacked for molding.

The materials used by the FDM additive manufacturing are mostly the wire-shaped thermofusible materials. Since the thermofusible materials themselves have certain shrinkage ratios, the sizes and the quality of molding are further affected. Therefore, in order to enhance the printing quality, the temperature of the molding space should be lower than the heat distortion temperature of the thermofusible materials.

However, since the extrusion nozzles of FDM additive manufacturing are heated to a specific temperature to make the thermofusible materials fuse to the molten state, if the temperature of the molding space is lower than the heat distortion temperature of the thermofusible materials, then the temperature adjacent to the nozzles is approaching the heat distortion temperature of the thermofusible materials. Consequently, the thermofusible materials are easy to be softened, which makes the strength of the thermofusible materials be decreased. The friction between the ratchet and the thermofusible materials is also changed, such that the materials cannot be extruded smoothly, and the quality of printing is further lowered.

In prior arts, the temperature is decreased by air flow through disposing fans adjacent to the ratchet. However, since the temperature adjacent to the nozzles is already close to the heat distortion temperature of the materials, the cooling effect of using air inside the extrusion nozzle to operate convection are limited. In addition, when the fans rotate, the extrusion nozzles are easy to vibrate, which makes the printing operations unstable and affect the printing quality.

Therefore, there is a need of providing an extrusion device of a three-dimensional printer and a cooling mechanism and a cooling method thereof to solve the drawbacks in prior arts, solve the questions of decreasing the temperature of thermofusible materials, and achieve the advantage of enhancing the cooling effect and the printing quality.

SUMMARY OF THE INVENTION

It is an object of the present invention to provide an extrusion device of a three-dimensional printer and a cooling mechanism and a cooling method thereof in order to solve the drawbacks of prior art.

The present invention provides an extrusion device of a three-dimensional printer and a cooling mechanism thereof. By disposing an air-guiding cooling mechanism, the temperature of the thermofusible materials is decreased to maintain the strength of the thermofusible materials, and further the printing quality is enhanced.

The present invention also provides an extrusion device of a three-dimensional printer and a cooling mechanism thereof. An air pipe is configured for guiding the air extracted by the air pump to flow to the extrusion device, so the environment temperature is decreased, such that the printing operation becomes more stable. The advantages of enhancing the cooling effect and the printing quality are achieved. In addition, since the air pipe is flexible, when the extrusion device is moved, the flexible air pipe can be bent to match with the positions of the extrusion device of the three-dimensional printer, such that the flow of the air is unaffected.

The present invention further provides a cooling method. By detecting whether the environment temperature is close to the heat distortion temperature of the thermofusible material or not and controlling the cooling mechanism to perform the cooling operation, the strength of the thermofusible material is maintained, and the printing quality is enhanced.

In accordance with an aspect of the present invention, there is provided an extrusion device of a three-dimensional printer. The extrusion device of the three-dimensional printer comprises a housing, a nozzle, a ratchet, an idler, and a cooling mechanism. The nozzle is connected with the housing, the ratchet is disposed in the housing, and the idler is disposed adjacent to the ratchet. A thermofusible material is jointly held by the ratchet and the idler, and is guided to be extruded through the nozzle. The cooling mechanism comprises an air pump and an air pipe. The air pipe is partially disposed in the housing and connected with the air pump for guiding the air extracted by the air pump to flow into the housing through the air pipe, thereby reducing an environment temperature inside the housing.

In accordance with another aspect of the present invention, there is provided a cooling mechanism of an extrusion device of a three-dimensional printer. The extrusion device of the three-dimensional printer comprises a housing and a ratchet, and the ratchet is disposed in the housing. The cooling mechanism comprises an air pump and an air pipe, the air pipe is partially disposed in the housing and connected with the air pump for guiding the air extracted by the air pump to flow into the housing through the air pipe, thereby reducing the environment temperature in the housing.

In accordance with still another aspect of the present invention, there is provided a cooling method. The cooling method comprises steps of: (a) providing a ratchet, a temperature detection element, and a cooling mechanism, wherein the cooling mechanism comprises an air pump and an air pipe; (b) sensing an environment temperature adjacent to the ratchet by the temperature detection element; (c) judging whether the environment temperature is higher than a threshold temperature; (d) allowing the cooling mechanism to perform a cooling operation for extracting air by the air pump, and guiding the air extracted by the air pump to flow to the ratchet through the air pipe, thereby reducing the environment temperature; and (e) finishing the cooling operation. If the result of judgement of the step (c) is True, the step (d) is performed, and then the step (b) and the step (c) are re-performed. If the result of judgement of the step (c) is False, the step (e) is performed, and then the step (b) and the step (c) are re-performed The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
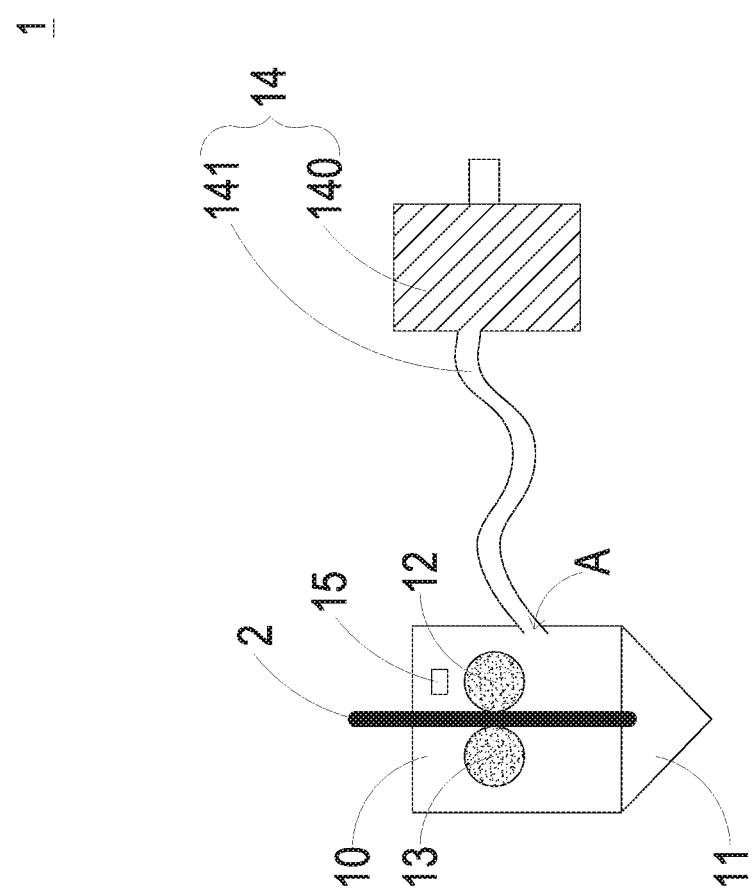
FIG. 1 schematically illustrates the structure of an extrusion device of a three-dimensional printer and a cooling mechanism thereof according to an embodiment of the present invention.
Figure 2:
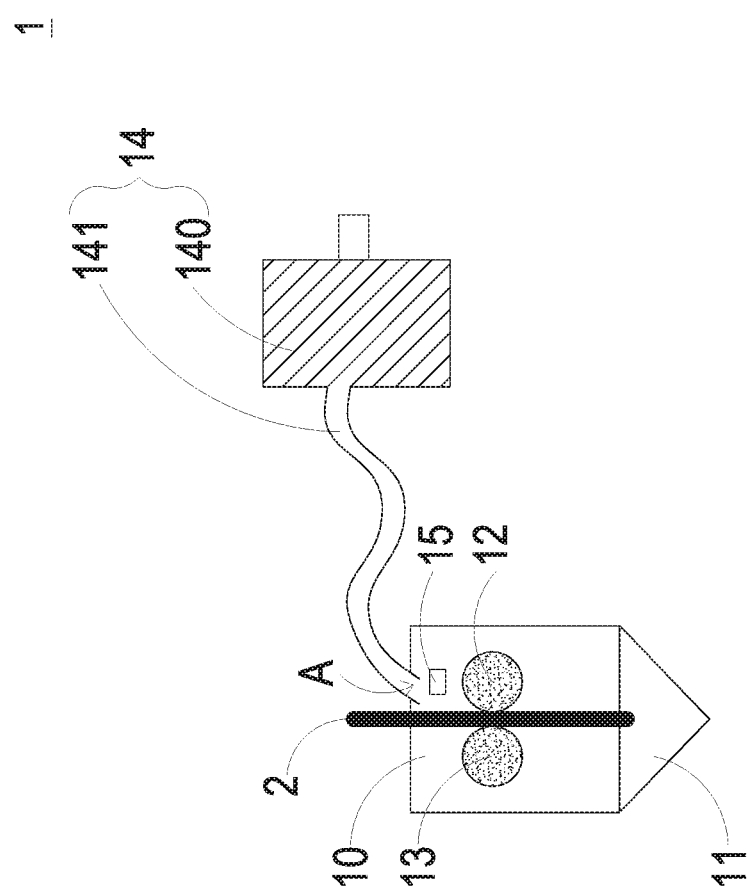
FIG. 2 schematically illustrates the structure of an extrusion device of a three-dimensional printer and a cooling mechanism thereof according to another embodiment of the present invention.
Figure 3:
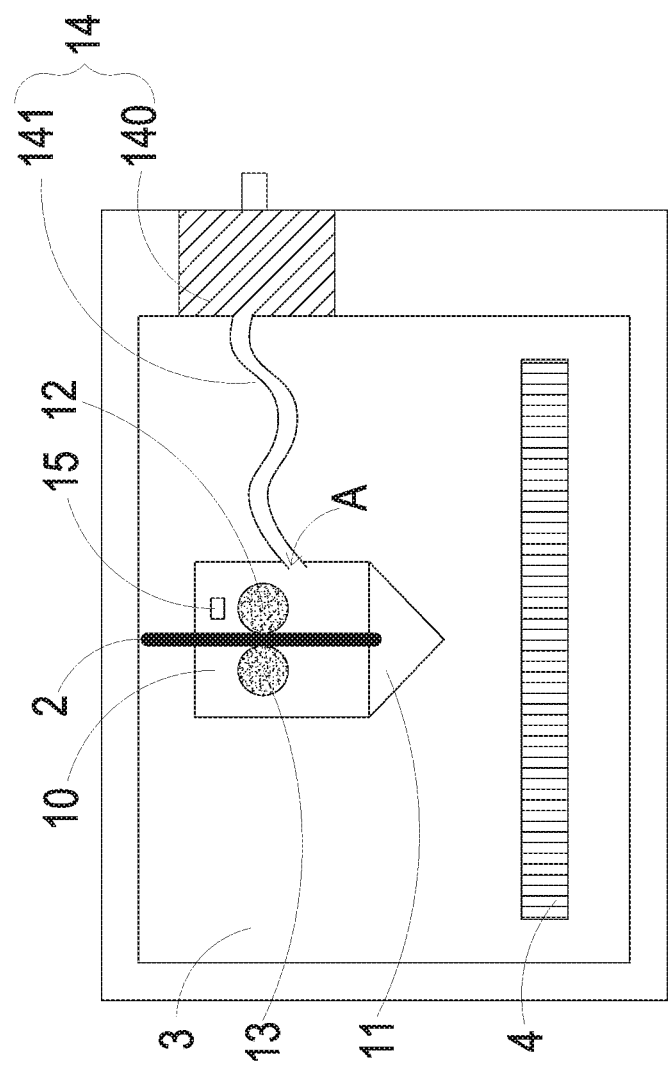
FIG. 3 schematically illustrates the structure of an extrusion device of a three-dimensional printer and a cooling mechanism thereof according to still another embodiment of the present invention.

Please refer to FIG. 1, FIG. 2 and FIG. 3. FIG. 1 schematically illustrates the structure of an extrusion device of a three-dimensional printer and a cooling mechanism thereof according to an embodiment of the present invention. FIG. 2 schematically illustrates the structure of an extrusion device of a three-dimensional printer and a cooling mechanism thereof according to another embodiment of the present invention. FIG. 3 schematically illustrates the structure of an extrusion device of a three-dimensional printer and a cooling mechanism thereof according to still another embodiment of the present invention. As shown in FIG. 1, FIG. 2 and FIG. 3, the extrusion device of the three-dimensional printer 1 of the present invention comprises a housing 10, a nozzle 11, a ratchet 12, an idler 13 and a cooling mechanism 14, and the housing 10 can be an enclosed housing or a non-enclosed housing. The nozzle 11 is connected with the housing 10, the ratchet 12 is disposed in the housing 10, and the idler 13 is disposed adjacent to the ratchet 12. A thermofusible material 2 is jointly held by the ratchet 12 and the idler 13, and the thermofusible material 2 is guided to be extruded through the nozzle 11. The cooling mechanism 14 comprises an air pump 140 and an air pipe 141. The air pipe 141 is partially disposed in the housing 10 and connected with the air pump 140 for guiding the air extracted by the air pump 140 to flow into the housing 10 through the air pipe 141, thereby reducing an environment temperature inside the housing 10.

When the ratchet 12 is rotated, a normal force is provided to the thermofusible material 2 by the idler 13, a friction is caused between the ratchet 12 and the thermofusible material 2, and the thermofusible material 2 is guided to be extruded through the nozzle 11. Furthermore, the idler 13 is driven to rotate by the thermofusible material 2, and the rotation direction of the idler 13 is opposite to the rotation direction of the ratchet 12.

In some embodiments, the extrusion device of the three-dimensional printer 1 further comprises a temperature-controlled chamber 3. The housing 10 and the nozzle 11 are disposed in the temperature-controlled chamber 3, and the air pump 140 is disposed outside the temperature-controlled chamber 3 for extracting the air outside the temperature-controlled chamber 3. The air pipe 141 is partially disposed in the temperature-controlled chamber 3 for guiding the air extracted by the air pump 140 to flow into the housing 10 through the air pipe 252, thereby reducing the environment temperature inside the housing 10. In other embodiments, the extrusion device of the three-dimensional printer 1 further comprises a heating plate 4, and the heating plate 4 is disposed relative to the nozzle 11 in the temperature-controlled chamber 3. For example, if the nozzle 11 is disposed on the upper side of the temperature-controlled chamber 3, the heating plate 4 is disposed on the lower side of the temperature-controlled chamber 3, but not limited herein.

The extrusion device of the three-dimensional printer 1 of the present invention further comprises a temperature detection element 15 and a control unit (not shown). The temperature detection element 15 is disposed adjacent to the ratchet 12 for sensing the temperature, and the control unit is connected with the temperature detection element 15 and the cooling mechanism 14. The value of the temperature sensed by the temperature detection element 15 is received and analyzed by the control unit, and transmitted to the cooling mechanism 14, such that a cooling operation is performed by the cooling mechanism 14 through the control unit.

Please refer to FIG. 1 again. As shown in FIG. 1, an air vent A of the air pipe 141 is disposed adjacent to the ratchet 12 for guiding the air extracted by the air pump 140 to flow to the ratchet 12 through the air pipe 141. In some embodiments, the air pipe 141 is a flexible pipe, and the flexible air pipe 141 can be bent to match with the positions of the extrusion device of the three-dimensional printer 1, such that the flow of the air is unaffected.

Please refer to FIG. 2 again. As shown in FIG. 2, in some embodiments, the air vent A of the air pipe 141 is disposed adjacent to the junction of the thermofusible material 2 and the housing 10 for guiding the air extracted by the air pump 140 to flow to the thermofusible material 2 through the air pipe 141. Since the air vent A of the air pipe 141 is directly disposed toward the thermofusible material 2 for more effectively cooling the thermofusible material 2.

In brief, the present invention provides an extrusion device of a three-dimensional printer and a cooling mechanism thereof. By disposing an air-guiding cooling mechanism, the temperature of the thermofusible materials is decreased to maintain the strength of the thermofusible materials, and the printing quality is enhanced. Furthermore, an air pipe is configured for guiding the air extracted by the air pump to flow to the extrusion device, so the environment temperature is decreased, such that the printing operation becomes more stable. Therefore, the advantages of enhancing the cooling effect and the printing quality are achieved.

Figure 4:
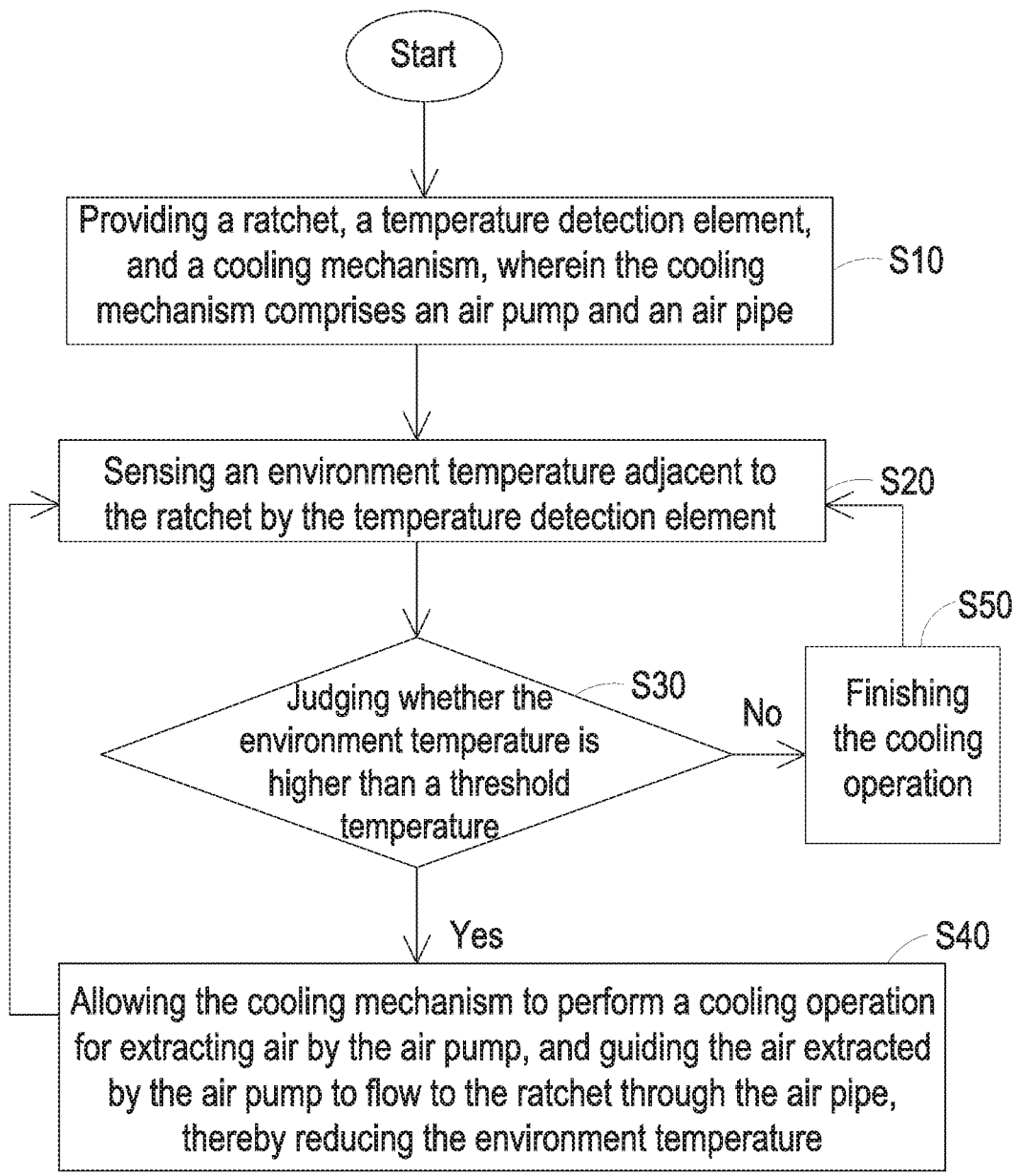
FIG. 4 is a flowchart of a cooling method of an extrusion device of a three-dimensional printer according to an embodiment of the present invention.

Please refer to FIG. 1, FIG. 2, FIG. 3 and FIG. 4. FIG. 4 is a flowchart of a cooling method of an extrusion device of a three-dimensional printer according to an embodiment of the present invention. As shown in FIG. 1, FIG. 2, FIG. 3, and FIG. 4, the cooling method of the extrusion device of the three-dimensional printer comprises the following steps. Firstly, in a step S10, a ratchet 12, a temperature detection element 15, and a cooling mechanism 14 is provided, among which the cooling mechanism 14 comprises an air pump 140 and an air pipe 141. In some embodiments, the air pipe 141 is a flexible pipe, but not limited herein.

Then, in a step S20, an environment temperature adjacent to the ratchet 12 is sensed by the temperature detection element 15. Then, in a step S30, judge whether the environment temperature is higher than a threshold temperature, among which the threshold temperature can be any temperature selected from the temperature range which is 10° C.-20° C. lower than the heat distortion temperature of the thermofusible material 2. For example, if the heat distortion temperature of the thermofusible material 2 is 60° C., the threshold temperature can be any temperature selected from the temperature range of 40° C. to 50° C. In some embodiments, the value of the environment temperature sensed by the temperature detection element 15 is received and analyzed by the control unit, and the judgment of whether the environment temperature is higher than a threshold temperature is implemented by the control unit, but not limited thereto.

If the result of judgement of the step S30 is True, the step S40 is performed, and then the step S20 and the step S30 are re-performed. In the step S40, the cooling mechanism 14 is allowed to perform a cooling operation for extracting air by the air pump 140, and the air extracted by the air pump 140 is guided to flow to the ratchet 12 through the air pipe 141, thereby reducing the environment temperature. If the result of judgement of the step S30 is False, the step S50 is performed to finish the cooling operation, and then the step S20 and the step S30 are re-performed, in order to continuously detect whether the environment temperature is higher than the threshold temperature or not.

That is, through the cooling method of the present invention, continuous detection to the environment temperature of the extrusion device of the three-dimensional printer can be achieved, such that the molding quality of the three-dimensional printing is ensured.

From the above description, the present invention provides an extrusion device of a three-dimensional printer and a cooling mechanism and a cooling method thereof in order to solve the drawbacks of prior arts. By disposing an air-guiding cooling mechanism, the temperature of the thermofusible materials is decreased to maintain the strength of the thermofusible materials, and further the printing quality is enhanced. Furthermore, an air pipe is configured for guiding the air extracted by the air pump to flow to the extrusion device, so the environment temperature is decreased, such that the printing operation becomes more stable. The advantages of enhancing the cooling effect and the printing quality are achieved. In addition, since the air pipe is flexible, when the extrusion device is moved, the flexible air pipe can be bent to match with the positions of the extrusion device of the three-dimensional printer, such that the flow of the air is unaffected. Meanwhile, by detecting whether the environment temperature is close to the heat distortion temperature of the thermofusible material or not and controlling the cooling mechanism to perform the cooling operation, the strength of the thermofusible material is maintained, and the printing quality is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An extrusion device of a three-dimensional printer, comprising:
   a housing;
   a nozzle connected with the housing;
   a ratchet disposed in the housing;
   an idler disposed adjacent to the ratchet, wherein a thermofusible material is jointly held by the ratchet and the idler and guided to be extruded through the nozzle; and
   a cooling mechanism comprising an air pump and an air pipe, wherein the air pipe is partially disposed in the housing and is connected with the air pump,
   wherein the air pipe is configured for guiding the air extracted by the air pump to flow to the extrusion device, and an air vent of the air pipe is directly disposed toward the thermofusible material.

2. The extrusion device of the three-dimensional printer according to claim 1, wherein when the ratchet is rotated, a normal force is provided to the thermofusible material by the idler, the thermofusible material is guided to be extruded through the nozzle, and the idler is driven to rotate by the thermofusible material, wherein the rotation direction of the idler is opposite to the rotation direction of the ratchet.

3. The extrusion device of the three-dimensional printer according to claim 1 further comprising a temperature detection element disposed adjacent to the ratchet for sensing the temperature.

4. The extrusion device of the three-dimensional printer according to claim 1 further comprising a temperature-controlled chamber, wherein the housing and the nozzle are disposed in the temperature-controlled chamber, the air pump is disposed outside the temperature-controlled chamber, and the air pipe is partially disposed in the temperature-controlled chamber for guiding the air extracted by the air pump to flow into the housing through the air pipe, thereby reducing the environment temperature inside the housing.

5. The extrusion device of the three-dimensional printer according to claim 4 further comprising a heating plate disposed relative to the nozzle in the temperature-controlled chamber.

6. The cooling mechanism according to claim 1, wherein the air pipe is a flexible pipe.

* * * * *